July 3, 1934.  E. K. ROSCHER ET AL  1,965,525
RAILWAY CAR FOR TRANSPORTING PASSENGER CARRYING
AUTOMOBILES AND SIMILAR VEHICLES OR ARTICLES
Filed Oct. 29, 1929  4 Sheets-Sheet 1
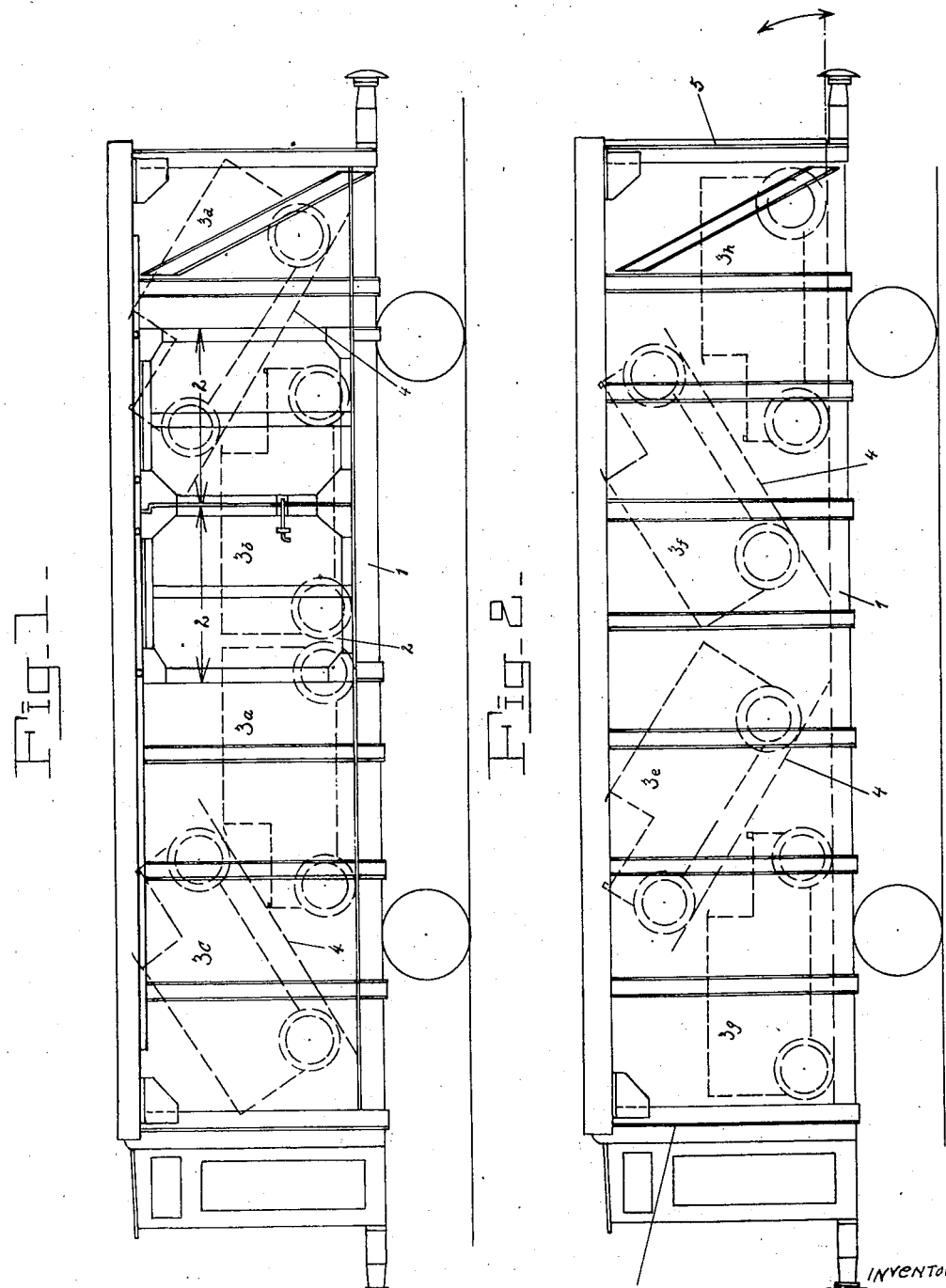

July 3, 1934. E. K. ROSCHER ET AL 1,965,525
RAILWAY CAR FOR TRANSPORTING PASSENGER CARRYING
AUTOMOBILES AND SIMILAR VEHICLES OR ARTICLES
Filed Oct. 29, 1929 4 Sheets-Sheet 2
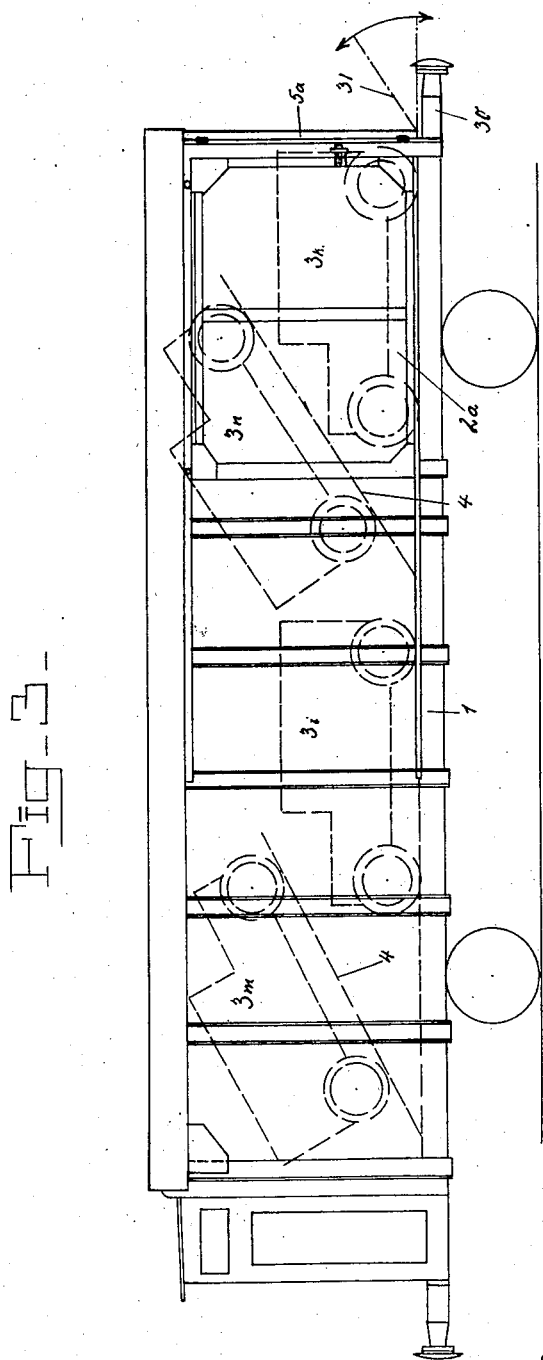
E. K. Roscher &
W. Kahmann
INVENTOR
By Marks & Clerk
Attys.

July 3, 1934. E. K. ROSCHER ET AL 1,965,525
RAILWAY CAR FOR TRANSPORTING PASSENGER CARRYING
AUTOMOBILES AND SIMILAR VEHICLES OR ARTICLES
Filed Oct. 29, 1929 4 Sheets-Sheet 3
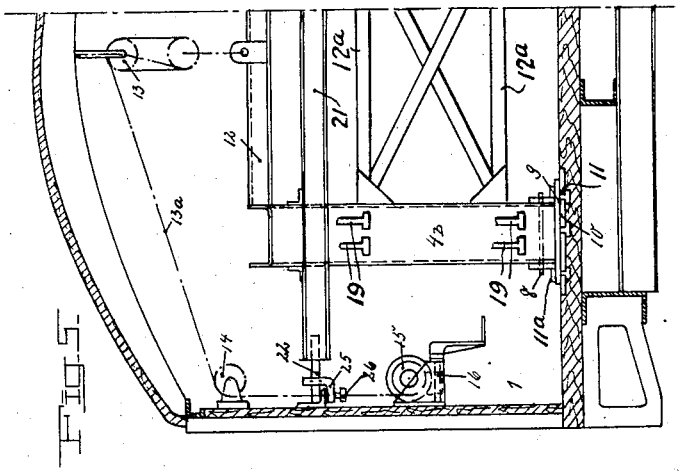
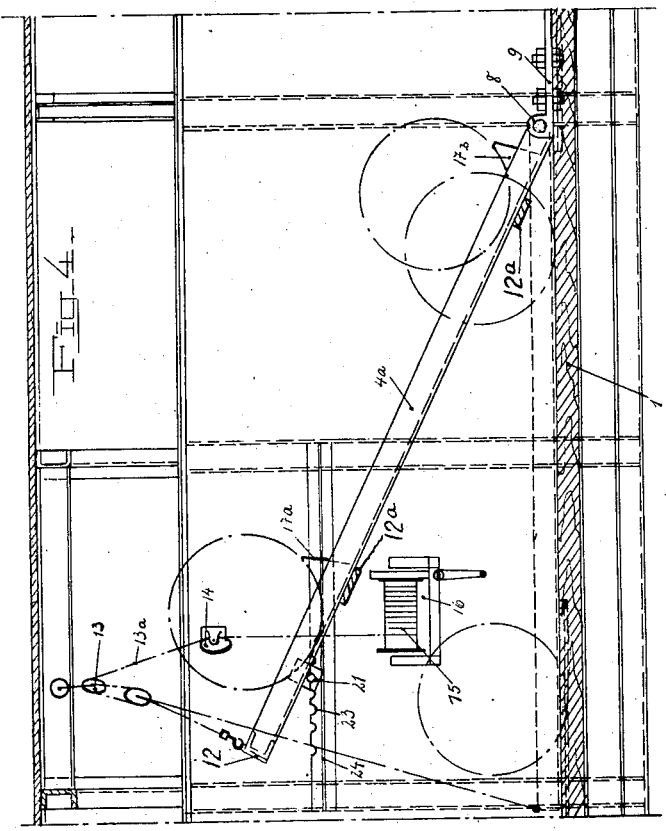
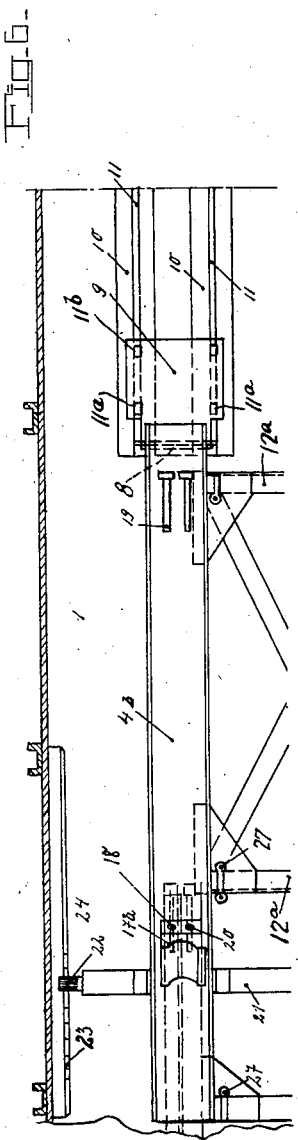
E. K. Roscher &
W. Rahmann, INVENTORS
Marks & Clerk
Attys.

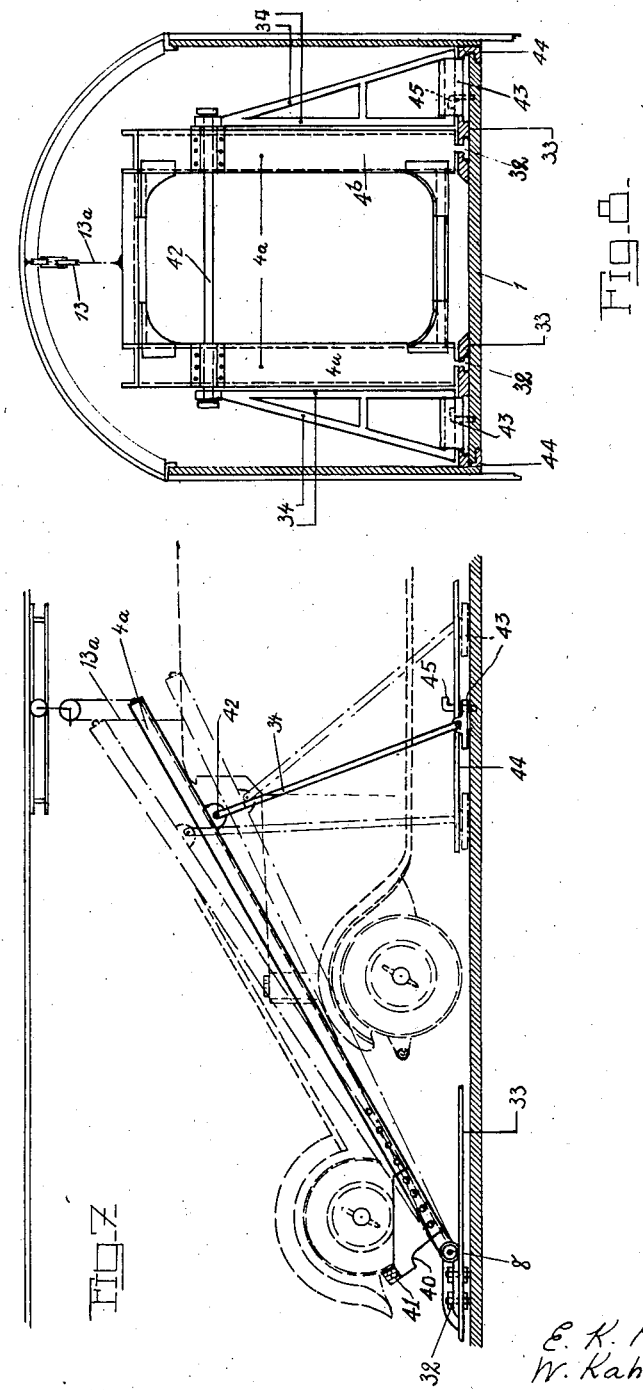

Patented July 3, 1934

1,965,525

UNITED STATES PATENT OFFICE 1,965,525

RAILWAY CAR FOR TRANSPORTING PASSENGER CARRYING AUTOMOBILES AND SIMILAR VEHICLES OR ARTICLES

Ernst Karl Roscher, Hamburg-Wandsbek, and Walter Kahmann, Wismar, Germany; said Roscher assignor to Arnold Bernstein, Hamburg, Germany Application October 29, 1929, Serial No. 403,284
In Germany November 29, 1928

9 Claims. (Cl. 105—368)

Railway cars for transporting passenger carrying automobiles and similar vehicles or articles are known in which, for the purpose of economizing space, a part of the load is held on the slant by means of fixed retaining frames. It is also known to make such stowage frames as carrier frames or bearer bars but always fixedly arranged. It has also been proposed, to arrange one automobile on the slant and another one horizontally, below the one that is on the slant and partially underneath the same; but in this instance the raised automobile is held in position by removable vertical stanchions which are attached to the front wheel axles after the front wheels have been taken off. All the known arrangements have great disadvantages.

In contradistinction to what is known, the new arrangement according to the present invention consists in fitting railroad cars with such lifting and fastening devices which allow that of every two automobiles a loading unit may be formed, whereof one is placed horizontally and the second one on the slant, in such a manner that one automobile, in order to get it into the slanting position, is run on to a lifting frame and is lifted therewith, with its lowest end up, into the inclined position so that both front and rear wheels are raised materially up from the bottom until the uppermost point of it nearly touches the roof of the car and in which position it is secured while the second automobile of the loading unit is then run, with its lowest end ahead as far as suitable under the first one so that the two automobiles overlap one another in inclined relationship.

Novel and important means for carrying out this new method is provided by a retaining frame, consisting of a carrier frame, or bearer bars or the like, which can be oscillated about a transverse axis located at or near the floor of the car and is slidable longitudinally thereof. This retaining device may be pivotally connected at one end to slide plates which may be arranged either so as to be adjustable longitudinally along the floor of the car or so as to be completely detachable therefrom, while a transverse member at the other end is furnished with a cable for hoisting tackle or with a point of attachment for some other lifting device.

It is further essential, in order to transfer the load to the car floor, that a traverse, engaged under the free tiltable end of the carrier frame, or of the bearer bars or the like, be arranged in rests or stops on the side walls of the wagon, which are propped up from the floor thereof. A clamping device is then preferably provided, by means of which the traverse, or the like, supporting the carrier device can be firmly clamped after insertion in the rests.

In a second embodiment of the invention a carrier device is provided in the form of bearer bars connected to form a closed and displaceable lifting frame which, for its part is supported, from the car bottom both vertically and horizontally, by diagonally stiffened struts, preferably, for instance, in such a manner that the lifting frame and struts can also be fixed at different angles.

To provide for repetition of the arrangement of loading units it is preferable in such cases to arrange several carrier frames in one car at the same time, more especially in such a fashion that under each of the frames in an inclined position an automotbile can be disposed in horizontal position. With this arrangement the disposition of the carrier frames may be such that two or more carrier frames or bearer bars in their inclined position form acute angles with the floor of the car, the angles opening towards the same end of said car or, it may be, opening towards opposite ends thereof.

Embodiments of the invention are illustrated, by way of example, in the accompanying drawings, in which Fig. 1 is a side elevation of a railway transport car with doors arranged at the sides thereof and loaded with four automobiles which are shown ready mounted thereon.

Fig. 2 is a similar elevation of a railway car with doors arranged at the two ends.

Fig. 3 shows a further possible arrangement of four automobiles in a railway transport car with doors both at the one end and close to this end in the side walls.

Fig. 4 is a longitudinal section through a part of the railway transport car and shows the lifting device arranged therein.

Fig. 5 is an end elevation and

Fig. 6 a plan view of a part of Fig. 4.

Another constructional form of the lifting frame is shown in Figs. 7 and 8.

Fig. 1 of the drawings shows a railway transport car which in itself, may be of any known or preferred construction, with sliding doors 2 arranged in its side walls. According to the invention the transport car 1 is loaded with four automobiles the automobiles 3a and 3b in the middle of said car standing upon the floor thereof, while the two outside automobiles 3c and 3d are arranged on separate carrier frames 4, hereinafter more particularly described, and are set on the slant by hoisting the ends turned towards the middle of the car, so that they partly overlap the automobiles 3a, 3b standing in the middle. Loading is effected by first loading the automobiles 3c and 3b on to the transport car one after the other through the door opening 2 and running them on to the carrier frames 4 lying on the floor thereof, said frames being then hoisted into the slanting position, as shown. Hereupon the automobile 3a is loaded on and pushed forward so far along the floor of the transport car 1 that its forward end lies underneath the upper end of the obliquely disposed frame 4, carrying the automobile 3c. Finally the automobile 3b is loaded on to the car, the forward end thereof coming to rest under the upper end of the frame 4 which carries the automobile 3d.

Where transport cars are concerned which are loaded not from the side but from the two ends the automobiles are preferably arranged in the manner shown in Fig. 2 upon the car the end walls of which are furnished with flap doors 5. Here the automobiles 3e and 3f in the middle of the car stand on obliquely placed frames 4 while the two other automobiles 3g and 3h stand on the floor of the car. Loading of the transport wagon 1 is effected in this case by first of all loading the automobiles 3e and 3f from the ends, through the door openings 5, on to the carrier frames 4, then in the downturned position, these frames being afterwards hoisted up at their free ends. The automobiles 3g and 3h are then loaded on and pushed so far into the transport car 1 that their front ends fill up the space beneath the raised ends of the frames 4 carrying the automobiles 3e and 3f.

While in the railroad car illustrated in Figs. 1 and 2 unloading has to be effected in exactly the reverse manner as the loading i. e. from and to one of the side doors, as in Fig. 1 or from and to each of the two end doors (5) as in Fig. 2, in Fig. 3 a railway transport car is shown in which, owing to special arrangement of the car doors, loading and unloading can be carried out either through the sidewalls or through the end, whichever way is preferred. This is effected by providing the railway transport car 1 with flap doors 5a at the one end and with sliding doors 2a in one, or it may be, both of the side walls at that end thereof which adjoins the aforementioned end of the car. The car is preferably loaded in the following manner: according as the said car is to be loaded from the side or from the end, so the door opening 2a or the door opening 5ª is used for the introduction of an automobile 3m, which is pushed up to the end of said car and there lifted into the slanting position, as shown. Hereupon the automobile 3i is loaded on and pushed forward far enough for it to stand partly underneath the sloping upper end of the carrier frame 4 bearing the automobile 3m. Then the automobile 3n is loaded on and sloped on the corresponding carrier frame 4 and, finally, the fourth automobile 3k is pushed on to the transport car and arranged on the floor thereof adjacent the side door 2a. Since the width of the door 2a corresponds approximately to the length of an automobile and the door opening is arranged at the end of the side wall, the fourth automobile can be loaded on from the side of the car without difficulty. As will be obvious without further description, the car can be unloaded equally well, either through the door opening 5a at the end thereof or through the side door opening 2a.

In order to facilitate loading and unloading from the end of the car a swinging platform 31 may be fixed over the buffers 30 to establish a connection between the floor of the car and an end ramp. When an end ramp is not available an inclined loading bridge is rested in known manner, up against the outer end of the lowered platform 31.

In certain cases, especially if the automobiles or other vehicles are not provided, as shown in Figs. 1 to 3, with closed bodies but are constructed as open vehicles, or when the articles to be loaded on to the car have a similar elongated shape, more than half, or even the whole of such articles can be arranged on slanting carrier frames or the like.

If the transport car be provided with doors at both ends it is possible to load a whole railway train from the end of the first or the last wagon, the automobiles or the like being conveniently disposed in a manner corresponding to the arrangement shown in Fig. 2 or Fig. 3.

The construction of carrier devices for the slanted automobiles as illustrated, by way of example in Figs. 4 to 6 consists essentially of two bars 4a and 4b of U shaped cross section tied together by transverse struts 12 and 12a and connected at one end by hinge pins 8 to plates 9 which are movable longitudinally of the car. The plates 9 rest on the slide bars 10 in the bottom of the car, said bars having longitudinal slots 11 through which screw bolts 11a are passed from below, these bolts passing through corresponding holes 11b in the plates 9 and serving to secure the one end of the carrier device in the desired position on the floor of the car. At the free ends the bars 4a and 4b, where they are tied together by the above mentioned cross strut 12, the end of a cable is fastened to said strut forming part of a lifting tackle 13 suspended from the roof of the car, the hoisting cable 13a of which is carried over a guide pulley 14, secured to the side wall of the car, to the drum 15 of a hand winch 16 also fixed to said side wall. This arrangement is used for hoisting up the free end of the carrier device. The two bearer bars 4a and 4b are furnished respectively with chocks 17a and 17b adapted, for instance, to hold the wheels of the vehicle which is to be lifted into an oblique position. These chocks 17a and 17b are secured to the bars 4a and 4b by means of screw bolts 18 which pass through longitudinal slots 19 in the bearer bars and elongated holes 20 running at right angles thereto in the chocks 17, so that the latter can be adjusted to suit both the track width of the vehicle on the carrier device and the wheelbase thereof.

Support for the free end of the bearer bars 4a and 4b, after hoisting them up by means of the hand winch 16, is afforded by a traverse 21 having, fixed to its ends, pins 22, which are inserted in recesses 23 in a pair of angle irons 24 fixed to the side walls of the car. The traverse 21, after being lodged in the selected recess 23 to support the bars 4a and 4b at the desired angle, is there secured by means of a clamping device 25 having a clamping screw 26 which is screwed up against the under side of the angle iron 24.

On the cross struts 12 and 12a, shackles 27 are provided adjacent the bearer bars 4a, 4b, these shackles serving for the attachment of cables, or the like by means of which the automobile can be fastened to the carrier device to prevent its unintentional displacement.

According to another embodiment of the invention the supporting frames are so constructed and arranged that the weight thereof as well as that of the vehicle positioned thereon is supported wholly upon the floor of the car independently of the roof and side walls of the latter. Such a construction is shown in side elevation in Fig. 7 and in end view in Fig. 8. Here the lifting frames 4a and 4b preferably consist of two U-shaped channel bars which are connected to form a rigid frame by means of angle irons and angle plates, their separation from each other being, for example, great enough to allow the wheels of an automobile which has to be lifted to run along in the channel bars when the frame is lying on the floor.

The frame is hinged at 8 to the floor of the car and the hinge is adjustably secured in position by means of bolts and nuts 32, the bolts having T-heads slidable in slotted plates 33 fixed to the car bottom. Thus by loosening the bolts 32, the hinge 8 may be moved to a desired position and thereafter secured in desired position by tightening the nuts on the bolts. Thus it is possible to shift the supporting frames in the longitudinal direction of the car, so as to suit different sizes of automobiles. By these means, also, the frame can easily be removed altogether. The raised automobile is held against rolling downwardly on the lifting frame by means of a sheet metal plate 40 and a chock 41 thereon engaging the rear wheel. On both sides of the wheel the plate 40 is bolted to the flanges of the channel bars. The arrangement is such that the plate can easily be removed and can also be fixed at various points along the channel bar, according to the length required. The lifting frame may be raised by means of a lifting tackle 13, which may be arranged on the deck beams of the car top or on a longitudinal bearer disposed therebetween. In order that the frame may be fixed during transport and the load taken off the lifting device, lateral struts 34 are preferably provided which transfer the load to the car bottom. The struts are, at their upper ends, connected and rotatably mounted by means of a cross strut 42 and have sliding shoes 43 on the ends next the car floor, in which shoes they are likewise pivotally secured. Furthermore the struts, as can be seen from Fig. 8, are diagonally stiffened, for instance, built up in triangulated form, so that they may also afford lateral support to the load during transport. Owing to the pivotal axis at 8 the lifting frame can be moved to various inclinations, as shown in Fig. 7, the struts 34 and sliding shoes 43 taking up the position shown in dotted lines. The shoes 43 are arranged to slide in guide plates 44 secured to the floor of the car and may be held in adjusted position by pins or like fastening devices 45.

The separation of the channel bars 4a and 4b may be varied at will, according to whether the automobile is to be held with the wheels on the channels or otherwise.

What we claim is:

1. An arrangement for the complete utilization of the stowage space of railway box cars for the transportation of motor cars wherein the height of the stowage space is less than the combined height of two motor cars comprising longitudinally disposed bearer bars for supporting the wheels of a fully wheeled motor car, means pivotally connecting said bars to the box car and acting to direct the movement of the bars and the motor car supported thereon from a horizontal position on the box car floor to a progressively increasing inclination with respect to said floor as said bars are elevated, means to fasten the motor car wheels to said bars before tilting them in a position longitudinally of said bars whereby, after the tilting movement, the lower motor car wheels are also raised a substantial distance above said floor, said pivotal connecting means preventing free longitudinal movement of the bars within the box car, the raised and inclined position of said motor car affording space thereunder for the compact accommodation of a second motor car supported on said floor.

2. An arrangement as claimed in claim 1 characterized by the provision of means for applying a single lifting force to said bars for raising them parallel to each other.

3. An arrangement as claimed in claim 1 characterized by the provision of adjustable means for supporting the bearer bars at varying inclinations.

4. An arrangement as claimed in claim 1 characterized in that said pivotal connecting means is adjustable with relation to the floor of the box car to vary the position of the bearer bars therein.

5. An arrangement as claimed in claim 1 characterized by the provision of means for adjustably securing the fastening means of the first mentioned motor car in variable positions longitudinally of the bearer bars.

6. An arrangement as claimed in claim 1 characterized in that said means pivotally connecting the bars to the box car includes plates adjustable longitudinally of the box car floor, a cross member connecting said bearer bars, and a lifting cable attached to the cross member and extending to the top of the box car.

7. An arrangement as claimed in claim 1 characterized in that said means pivotally connecting the bars to the box car includes plates adjustable longitudinally of the box car floor, a cross member connecting said bearer bars, a lifting cable attached to the cross member and extending to the top of the box car, rests arranged on the side walls of the box car, and a supporting bar engaged in said rests and supporting said bearer bars.

8. An arrangement as claimed in claim 1 characterized in that said means pivotally connecting the bars to the box car includes plates adjustable longitudinally of the box car floor, a cross member connecting said bearer bars, a lifting cable attached to the cross member and extending to the top of the box car, rests arranged on the side walls of the box car, a supporting bar engaged in said rests and supporting said bearer bars, and clamping means for releasably clamping the supporting bar in said rests.

9. An arrangement as claimed in claim 1 characterized in that said means pivotally connecting said bars to the box car includes plates pivotally connected to one end of said bars and adjustable longitudinally of the box car floor, a lifting device connected with the opposite end of said bars, and adjustable means to support said bearer bars in the desired inclined position.

ERNST K. ROSCHER.
WALTER KAHMANN.